US009633419B2

(12) United States Patent
Baek et al.

(10) Patent No.: US 9,633,419 B2
(45) Date of Patent: Apr. 25, 2017

(54) LENS DISTORTION CORRECTION DEVICE AND APPLICATION PROCESSOR HAVING THE SAME

(71) Applicant: Samsung Electronics Co., Ltd., Suwon-si (KR)

(72) Inventors: Byung-Joon Baek, Goyang-si (KR); Joon-Ki Paik, Seoul (KR); Tae-Chan Kim, Yongin-si (KR); Dong-Gyun Kim, Seoul (KR); Jin-Ho Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 9 days.

(21) Appl. No.: 14/605,173

(22) Filed: Jan. 26, 2015

(65) Prior Publication Data
US 2015/0363921 A1 Dec. 17, 2015

(30) Foreign Application Priority Data
Jun. 11, 2014 (KR) .................. 10-2014-0071040

(51) Int. Cl.
| | |
|---|---|
| *H04N 5/225* | (2006.01) |
| *G06T 5/00* | (2006.01) |
| *G06K 9/46* | (2006.01) |
| *G06K 9/52* | (2006.01) |
| *H04N 5/357* | (2011.01) |
| *G06T 5/20* | (2006.01) |

(52) U.S. Cl.
CPC ............... *G06T 5/006* (2013.01); *G06K 9/46* (2013.01); *G06K 9/522* (2013.01); *G06T 5/20* (2013.01); *H04N 5/3572* (2013.01); *G06K 2009/4666* (2013.01)

(58) Field of Classification Search
USPC ........................................ 348/360
See application file for complete search history.

(56) References Cited

U.S. PATENT DOCUMENTS

| | | | |
|---|---|---|---|
| 7,058,237 B2 | 6/2006 | Liu et al. | |
| 7,099,521 B2 | 8/2006 | Liu et al. | |
| 7,113,650 B2 | 9/2006 | Liu et al. | |

(Continued)

FOREIGN PATENT DOCUMENTS

| | | |
|---|---|---|
| JP | 2008536238 | 9/2008 |
| JP | 2010213175 | 9/2010 |

(Continued)

OTHER PUBLICATIONS

Seok-Han Lee, et al., Correction of Radial Distortion Using a Planar Checkerboard Pattern and Its Image, Graduate School of Advanced Imaging Science, Multimedia and Film; Chung-Ang University, Seoul, Korea; Department of Multimedia, Namseoul University, Chonan, Korea; in IEEE Trans. Consumer Electron., vol. 55, No. 1, pp. 27-33, Feb. 2009.

(Continued)

*Primary Examiner* — Stephen Coleman
(74) *Attorney, Agent, or Firm* — Onello & Mello, LLP

(57) ABSTRACT

A lens distortion correction device and an application processor having the same include a distortion correction unit configured to correct a distorted image into an undistorted image and an image enhancement unit configured to improve the undistorted image using a high-frequency component of the distorted image.

17 Claims, 9 Drawing Sheets

(56) References Cited

U.S. PATENT DOCUMENTS

| | | |
|---|---|---|
| 7,149,367 B2 | 12/2006 | Cutler |
| 7,184,609 B2 | 2/2007 | Liu et al. |
| 7,327,899 B2 | 2/2008 | Liu et al. |
| 8,000,559 B2 | 8/2011 | Kwon |
| 2005/0099504 A1* | 5/2005 | Nayar .................... H04N 5/235 348/222.1 |
| 2005/0180656 A1 | 8/2005 | Liu et al. |
| 2007/0206878 A1 | 9/2007 | Liu et al. |
| 2010/0033552 A1 | 2/2010 | Ogawa |
| 2010/0238313 A1* | 9/2010 | Ohki ........................ G06T 3/40 348/222.1 |
| 2011/0169969 A1* | 7/2011 | Matsuda ............ H04N 1/00204 348/207.2 |
| 2013/0222532 A1 | 8/2013 | Kamiya et al. |

FOREIGN PATENT DOCUMENTS

| | | |
|---|---|---|
| JP | 2011049733 | 3/2011 |
| KR | 101053464 | 8/2011 |
| WO | 2006112927 | 10/2006 |

OTHER PUBLICATIONS

Ciaran Hughes, et al., Equidistant Fish-Eye Perspective With Application in Distortion Centre Estimation, Image and Vision Computing 28 (2010) pp. 538-551.

Gilad Freedman, et al., Image and Video Upscaling From Local Self-Examples, Hebrew University of Jerusalem; in ACM Trans. Graphics, vol. 30, No. 2, pp. 12, Apr. 2011.

Zhou Wang, et al., Image Quality Assessment: From Error Visibility to Structural Similarity, IEEE Transactions on Image Processing, vol. 13, No. 4, Apr. 2004, pp. 600-612.

Noriaki Suetake, et al, Image Super-Resolution Based on Local Self-Similarity, Optical Review vol. 15, No. 1 (2008) pp. 26-30.

Donggyun Kim, et al., Lens Distortion Correction and Enhancement Based on Local Self-Similarity for High-Quality Consumer Imaging Systems, IEEE Transactions on Consumer Electronics, vol. 60, No. 1, Feb. 2014, pp. 18-22.

Junhee Park, et al., Lens Distortion Correction Using Ideal Image Coordinates, IEEE Transactions on Consumer Electronics, vol. 55, No. 3, Aug. 2009, pp. 987-991.

Frederic Devernay, et al., Straight Lines Have to Be Straight, Machine Vision and Applications (2001) 13: pp. 14-24.

* cited by examiner

LENS DISTORTION CORRECTION DEVICE AND APPLICATION PROCESSOR HAVING THE SAME

CROSS-REFERENCE TO RELATED APPLICATION

This U.S. non-provisional application claims priority under 35 U.S.C. §119 to Korean Patent Application No. 10-2014-0071040 filed on Jun. 11, 2014 in the Korean Intellectual Property Office (KIPO), the contents of which are herein incorporated by reference in their entirety.

BACKGROUND

Field

Embodiments of the present inventive concepts relate to a lens distortion correction device. More particularly, the embodiments of the present inventive concepts relate to a lens distortion correction device that corrects a distorted image into an undistorted image using a Gaussian interpolation kernel and enhances the undistorted image based on a local self-similarity (LSS) and an application processor having the same.

Description of Related Art

A wide-angle lens has become popular for photography as well as various digital imaging devices, such as surveillance systems, vehicle rearview cameras, and endoscopes.

Despite many advantages, wide-angle view images acquired by a single camera have radial distortion in the peripheral region, which results in significant degradation of image quality.

SUMMARY

Some embodiments of the present inventive concepts provide a lens distortion correction device that corrects a distorted image into an undistorted image using a Gaussian interpolation kernel and enhances the undistorted image based on a local self-similarity (LSS).

Some embodiments of the present inventive concepts provide an application processor having the lens distortion correction device.

Some embodiments of the present inventive concepts provide a mobile device having the application processor.

Some embodiments of the present inventive concepts provide an image sensor module having the lens distortion correction device.

According to an aspect of the present inventive concepts, a lens distortion correction device includes a distortion correction unit configured to correct a distorted image into an undistorted image and an image enhancement unit configured to enhance the undistorted image using a high-frequency component of the distorted image.

In some embodiments, a degree of distortion is determined according to a distortion ratio of a distance from a center of the distorted image to a distance from a center of the undistorted image.

In some embodiments, the distortion correction unit corrects a distorted image into an undistorted image using a Gaussian interpolation kernel and controls a size of the Gaussian interpolation kernel according to the degree of distortion.

In some embodiments, the distortion correction unit increases the size of the Gaussian interpolation kernel when the distortion ratio is greater than 1 and reduces the size of the Gaussian interpolation kernel when the distortion ratio is smaller than 1.

In some embodiments, a plurality of patches in the distorted image and a plurality of patches in the undistorted image each include a low-frequency component and the high-frequency component.

In some embodiments, the image enhancement unit configured to search for a patch having a closest integration value to an integration value of a patch in the undistorted image in a localized region in the distorted image, and enhance the undistorted image using the high-frequency component of the searched patch of the distorted image.

In some embodiments, the image enhancement unit combines the low-frequency component of a patch in the undistorted image with the high-frequency component of the searched patch of the distorted image and removes a blurring artifact from the undistorted image.

In some embodiments, the lens distortion correction device is applied to a super-resolution device.

According to another aspect of the present inventive concepts, an application processor includes a lens distortion correction device configured to receive an image signal from an image sensor, and the lens distortion correction device comprises a distortion correction unit configured to correct a distorted image into an undistorted image and an image enhancement unit configured to enhance the undistorted image using a high-frequency component of the distorted image.

In some embodiments, a degree of distortion is determined according to a distortion ratio of a distance from a center of the distorted image to a distance from a center of the undistorted image.

In some embodiments, the distortion correction unit corrects the distorted image into the undistorted image using a Gaussian interpolation kernel, controls a size of the Gaussian interpolation kernel according to the degree of distortion, increases the size of the Gaussian interpolation kernel when the distortion ratio is greater than 1, and reduces the size of the Gaussian interpolation kernel when the distortion ratio is smaller than 1.

In some embodiments, a plurality of patches in the distorted image and a plurality of patches in the undistorted image each include a low-frequency component and a high-frequency component.

In some embodiments, the image enhancement unit is configured to search for a patch having a closest integration value to an integration value of a patch in the undistorted image in a localized region in the distorted image, and enhance the undistorted image using a high-frequency component of the searched patch of the distorted image.

In some embodiments, the image enhancement unit combines the low-frequency component of a patch in the undistorted image with the high-frequency component of the searched patch of the distorted image and removes a blurring artifact from the undistorted image.

According to another aspect of the present inventive concepts, a mobile device includes an image sensor configured to receive an image through a wide-angle lens and an application processor configured to receive an image signal from the image sensor and perform image processing on the received image signal, and the application processor includes a distortion correction unit configured to correct a distorted image into an undistorted image and an image enhancement unit configured to enhance the undistorted image using a high-frequency component of the distorted image.

In some embodiments, a degree of distortion is determined according to a distortion ratio of a distance from a center of the distorted image to a distance from a center of the undistorted image.

In some embodiments, the distortion correction unit corrects the distorted image into the undistorted image using a Gaussian interpolation kernel, controls a size of the Gaussian interpolation kernel according to the degree of distortion, increases the size of the Gaussian interpolation kernel when the distortion ratio is greater than 1, and reduces the size of the Gaussian interpolation kernel when the distortion ratio is smaller than 1.

In some embodiments, a plurality of patches in the distorted image and a plurality of patches in the undistorted image each include a low-frequency component and the high-frequency component.

In some embodiments, the image enhancement unit is configured to search for a patch having a closest integration value to an integration value of a patch in the undistorted image in a localized region in the distorted image, and enhance the undistorted image using the high-frequency component of the searched patch of the distorted image.

In some embodiments, the image enhancement unit combines the low-frequency component of a patch in the undistorted image with the high-frequency component of the searched patch of the distorted image and removes a blurring artifact from the undistorted image.

According to another aspect of the present inventive concepts, an image sensor module includes an image sensor configured to receive an image through a wide-angle lens and a lens distortion correction device configured to receive a distorted image from the image sensor, and the lens distortion correction device includes a distortion correction unit configured to correct the distorted image into an undistorted image and an image enhancement unit configured to enhance the undistorted image using a high-frequency component of the distorted image.

In some embodiments, a degree of distortion is determined according to a distortion ratio of a distance from a center of the distorted image to a distance from a center of the undistorted image.

In some embodiments, the distortion correction unit corrects the distorted image into the undistorted image using a Gaussian interpolation kernel, controls a size of the Gaussian interpolation kernel according to the degree of distortion, increases the size of the Gaussian interpolation kernel when the distortion ratio is greater than 1, and reduces the size of the Gaussian interpolation kernel when the distortion ratio is smaller than 1.

In some embodiments, a plurality of patches in the distorted image and a plurality of patches in the undistorted image each include a low-frequency component and the high-frequency component, and the image enhancement unit is configured to search for a patch having a closest integration value to an integration value of a patch in the undistorted image in a localized region in the distorted image, and enhance the undistorted image using the high-frequency component of the searched patch of the distorted image.

In some embodiments, the image enhancement unit combines the low-frequency component of a patch in the undistorted image with the high-frequency component of the searched patch of the distorted image and removes a blurring artifact from the undistorted image.

According to another aspect of the present inventive concepts, there is provided a lens distortion correction device including a distortion correction unit configured to correct a distortion in a distorted image using a Gaussian interpolation kernel and generate an undistorted image, and an image enhancement unit configured to improve the undistorted image using a high-frequency component of the distorted image.

In some embodiments, the distortion correction unit determines a degree of distortion according to a distortion ratio of a distance from a center of the distorted image to a distance from a center of the undistorted image.

In some embodiments, the distortion correction unit corrects the distorted image into the undistorted image using a Gaussian interpolation kernel, controls a size of the Gaussian interpolation kernel according to the degree of distortion, increases the size of the Gaussian interpolation kernel when the distortion ratio is greater than 1, and reduces the size of the Gaussian interpolation kernel when the distortion ratio is smaller than 1.

In some embodiments, a plurality of patches in the distorted image and a plurality of patches in the undistorted image each include a low-frequency component and a high-frequency component and the image enhancement unit is configured to search for a patch having a closest integration value to an integration value of a patch in the undistorted image in a localized region in the distorted image, and improve the undistorted image using a high-frequency component of the searched patch of the distorted image.

In some embodiments, the image enhancement unit combines the low-frequency component of a patch in the undistorted image with the high-frequency component of the searched patch of the distorted image and removes a blurring artifact from the undistorted image.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts.

DETAILED DESCRIPTION OF THE EMBODIMENTS

Figure 1:
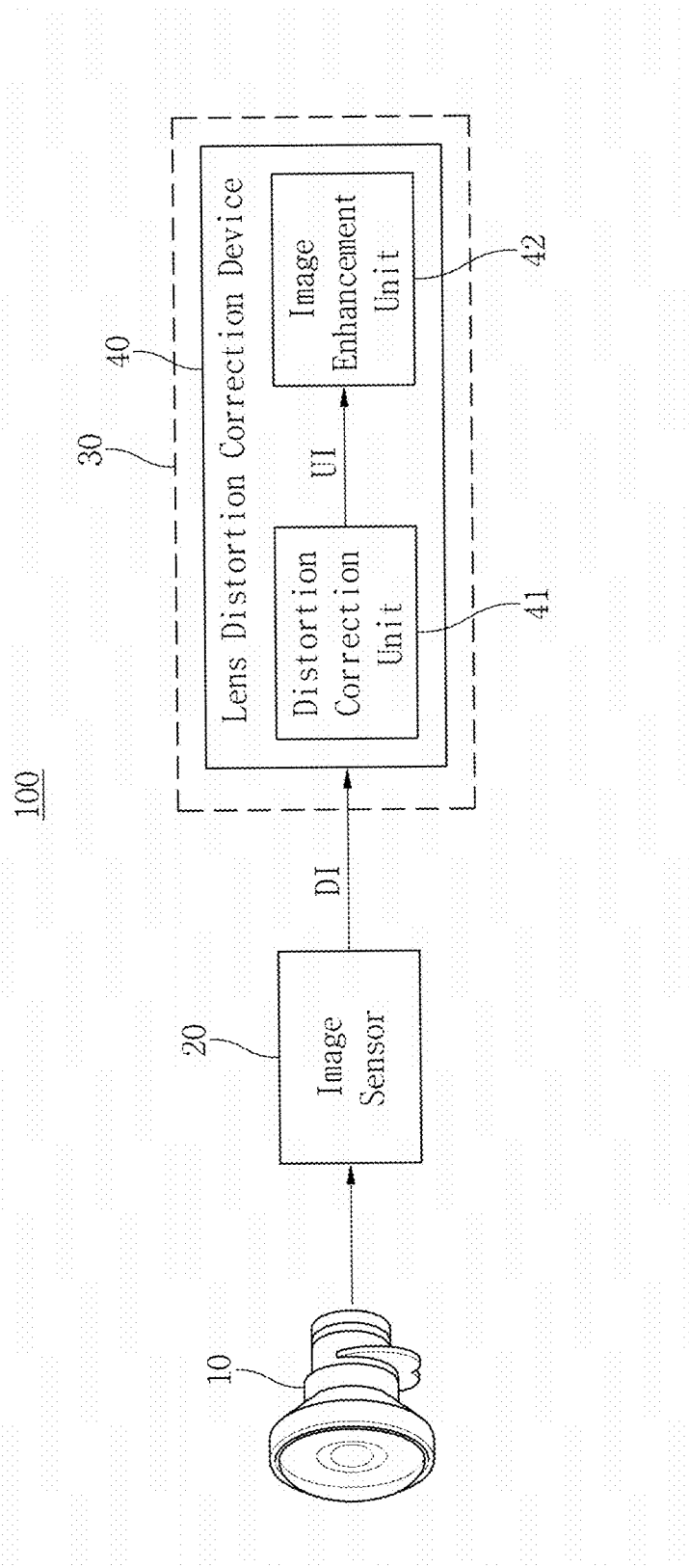
FIG. 1 is a block diagram illustrating a mobile device including a lens distortion correction device according to an example embodiment of the present inventive concepts.

Various example embodiments will be described more fully hereinafter with reference to the accompanying drawings, in which some example embodiments are shown. The present inventive concepts may, however, be embodied in many different forms and should not be construed as limited to the example embodiments set forth herein.

It will be understood that, although the terms "first," "second," "A," "B," etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concepts.

It will be understood that when an element or layer is referred to as being "on," "connected to" or "coupled to" another element or layer, it can be directly on, connected or coupled to the other element or layer or intervening elements or layers may be present. In contrast, when an element or layer is referred to as being "directly on," "directly connected to" or "directly coupled to" another element or layer, there are no intervening elements or layers present. The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the present inventive concepts.

Meanwhile, when it is possible to implement an embodiment in any other way, a function or an operation specified in a specific block may be performed differently from a flow specified in a flowchart. For example, consecutive two blocks may actually perform the function or the operation simultaneously, and the two blocks may perform the function or the operation conversely according to a related operation or function.

Some embodiments of the present inventive concepts will be described below with reference to attached drawings.

FIG. 1 is a block diagram illustrating a mobile device 100 including a lens distortion correction device according to an example embodiment of the present inventive concepts.

Referring to FIG. 1, the mobile device 100 may include a wide-angle lens 10, an image sensor 20, and an image processor 30. In some embodiments, the mobile device 100 may be, for example, a digital camera device, a smart-phone, a tablet, or the like.

The focal length of the wide-angle lens 10 may be shorter than the focal length of a standard lens. Using the wide-angle lens 10 results in more of the scene being photographed to being included in the photograph, and is useful in, for example, architectural, interior, and landscape photography. In some embodiments, the wide-angle lens 10 may include, for example, a fish-eye lens.

The image sensor 20 may acquire or receive an image of a subject through a wide-angle lens 10. In general, a picture taken using a wide-angle lens produces a distorted image. Thus, due to the use of the wide-angle lens 10, the image may be distorted. The image sensor 20 transfers the distorted image DI to the image processor 30. In some embodiments, the image sensor 20 may include, for example, a complementary metal-oxide-semiconductor (CMOS) image sensor and/or a charge-coupled device (CCD) image sensor.

The image processor 30 may include a lens distortion correction device 40 configured, or otherwise constructed and arranged, to correct the distorted image DI generated by the wide-angle lens 10. In some embodiments, the image processor 30 may be fabricated as one independent chip. In some embodiments, the image processor 30 may be implemented as a functional block in an application processor. In some embodiments, the image sensor 20 may include the image processor 30.

The lens distortion correction device 40 according to the example embodiment of the present inventive concepts may correct a distortion in an image using scalable Gaussian interpolation kernels and may enhance edges of the image using self-examples based on a local self-similarity (LSS). The lens distortion correction device 40 includes a distortion correction unit 41 and an image enhancement unit 42.

Specifically, the distortion correction unit 41 may generate an undistorted image UI by applying space-varying Gaussian interpolation kernels to the distorted image DI. In some embodiments, the lens distortion correction device 40 may be applied to a super-resolution device. The distortion correction unit 41 according to the example embodiment of the inventive concepts will be described hereinafter in connection with FIG. 2.

The image enhancement unit 42 may improve a boundary line using a self-example based on the LSS. The image enhancement unit 42 according to the example embodiment of the present inventive concepts will be described hereinafter in connection with FIGS. 5 and 6.

Figure 2:
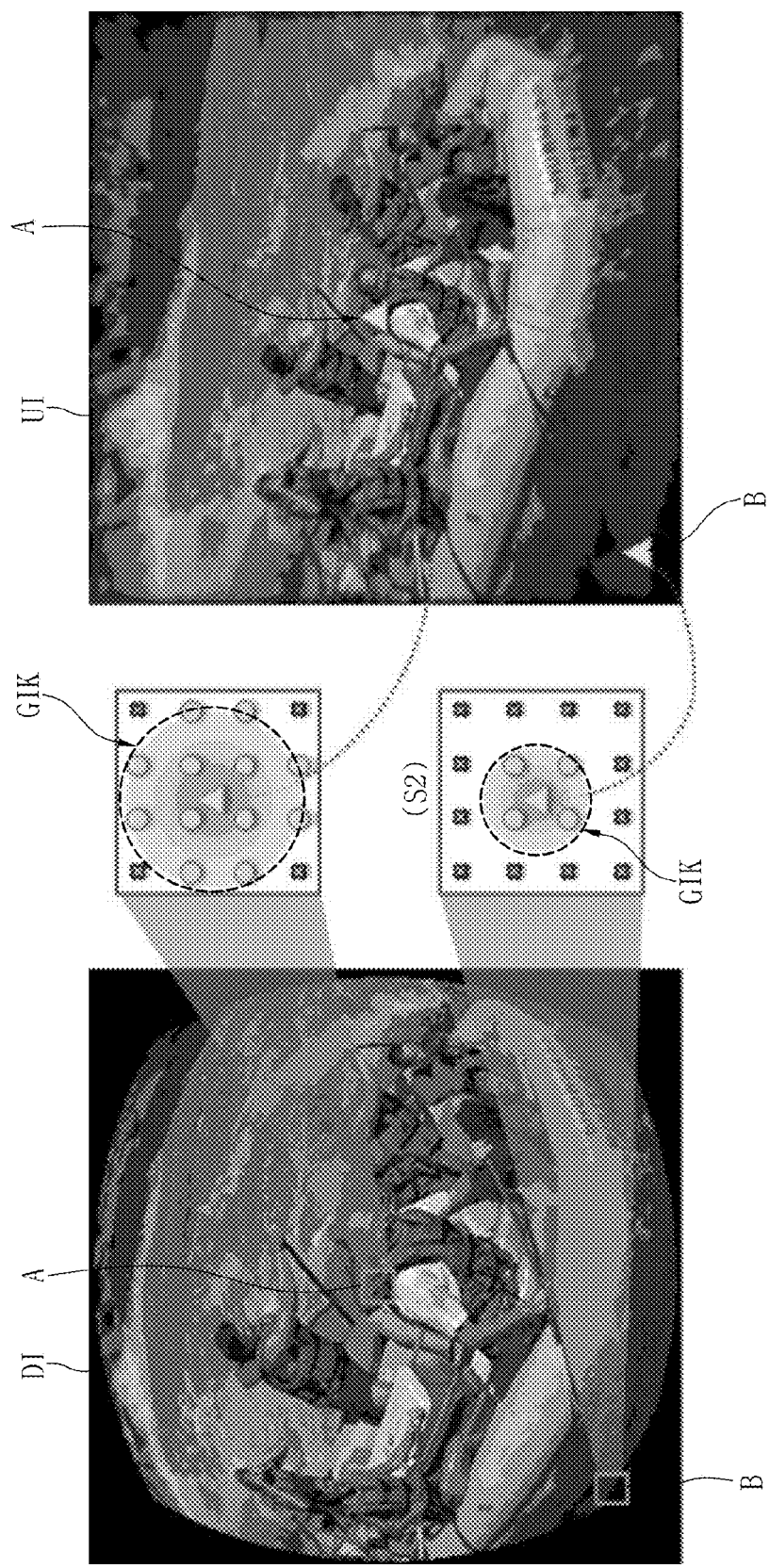
FIG. 2 is a conceptual diagram illustrating an operation for correcting a distorted image using the lens distortion correction device illustrated in FIG. 1 according to an example embodiment of the present inventive concepts

FIG. 2 is a conceptual diagram illustrating an operation for correcting a distorted image using the lens distortion correction device 40 illustrated in FIG. 1 according to an example embodiment of the present inventive concepts.

Referring to FIGS. 1 and 2, a central region A of the distorted image DI was expanded a lot in the distorted image, but a peripheral region B of the distorted image DI was minimized in the distorted image. Accordingly, the distortion correction unit 41 increases the size of the Gaussian interpolation kernel with regard to the central region A of the distorted image DI which has a relatively large amount of distortion. The distortion correction unit 41 decreases the size of the Gaussian interpolation kernel with regard to the peripheral region B of the distorted image DI which has a relatively small amount of distortion.

The distortion correction unit 41 may be configured to or otherwise constructed and arranged to, map pixels in the undistorted image UI to pixels in the distorted image DI. A pixel in the undistorted image UI, which is mapped to a pixel in the distorted image DI, may be used as a pixel for generating the undistorted image UI.

However, off-grid pixels in the undistorted image UI, that is, a pixel unmapped to a pixel in the distorted image DI, may be calculated using the Gaussian interpolation kernel GIK. For example, pixels A and B of the undistorted image UI are off-grid pixels.

For example, when a pixel in a central region A of the undistorted image UI does not correspond to one of the pixels in the distorted image DI, the distortion correction unit 41 may calculate an integration value of an unmapped pixel of the undistorted image UI by applying the Gaussian interpolation kernel GIK to pixels around the central region A.

In this embodiment, the Gaussian interpolation kernel GIK may be a weight based on pixels located around the central region A. The distortion correction unit 41 may calculate a weighted average based on each of the pixels located around the central region A. The distortion correction unit 41 may calculate an integration value of an unmapped pixel of the undistorted image UI using the weighted average.

Figure 3A:
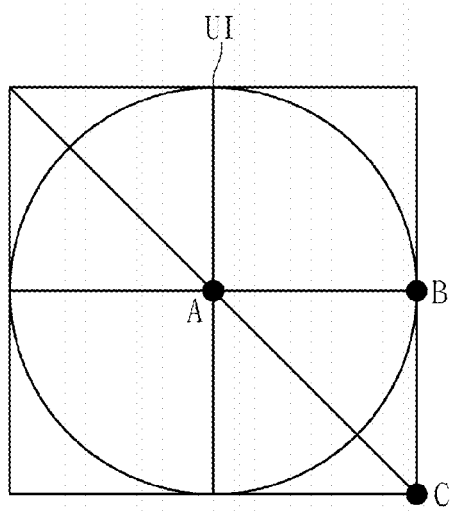
FIG. 3A illustrates an undistorted image.

FIG. 3A illustrates an undistorted image UI.

Referring to FIGS. 1 and 3A, the distortion correction unit 41 receives a distorted image DI from the wide-angle lens 10. And, the distortion correction unit 41 corrects the distorted image DI and generates the undistorted image UI.

Point A is located at the center of the undistorted image UI. Point B is located at the center of a vertical side of the undistorted image UI. And point C is located at a corner of the undistorted image UI.

Figure 3B:
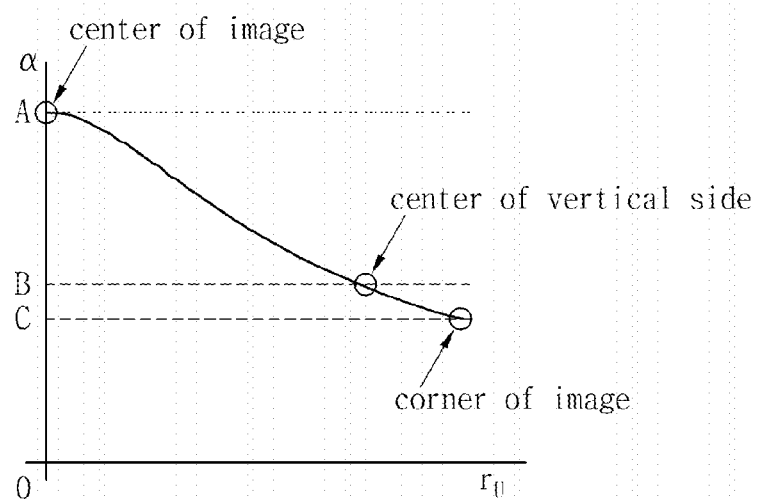
FIG. 3B is a graph illustrating a distortion ratio $\alpha$ according to a distance from a center of the undistorted image illustrated in FIG. 3A.

FIG. 3B is a graph illustrating a distortion ratio α according to a distance from the center of the undistorted image UI illustrated in FIG. 3A.

Referring to FIGS. 1 to 3B, the abscissa denotes the distance $r_U$ from the center of the undistorted image UI. The ordinate denotes a ratio α of the distance $r_D$ from the center of the distorted image DI to the distance $r_U$ from the center of the undistorted image UI. That is, α may be defined as $r_D/r_U$.

As the distance $r_U$ from the center of the undistorted image UI increases, α decreases. As α increases, a distortion of an image increases, and, as α decreases, the distortion of the image decreases. For example, α increases in a region of an image which has a significant amount of distortion, for example, a central region of an image and a peripheral region of an image, and α decreases in a region of an image which a small amount of distortion.

Theoretically, distortion of a wide-angle lens occurs in a radial manner. That is, distortion is symmetric to the optical axis that passes through the center of an image. As a result, the amount of distortion depends on the distance in the image from the center of the image.

Equation 1 may be defined as the relationship between distorted and undistorted coordinates.

$$x_D=\alpha(r_U)\cdot x_U, \; y_D=\alpha(r_U)\cdot y_U \qquad \text{[Equation 1]}$$

$x_U$ and $y_U$ represent the Cartesian coordinates in the undistorted image plane. $x_D$ and $y_D$ represent the Cartesian coordinates in the distorted image plane. $r_U$ is a distance from the center of an image (0,0) to ($x_U$, $y_U$) in the undistorted image. $r_D$ is a distance from the center of the image (0,0) to ($x_D$, $y_D$) in the distorted image. $\alpha(r_U)$ defined by the distortion ratio ($r_D/r_U$). The function or equation may be modeled by a high order polynomial or a logarithm.

Correction of the distorted image may be performed by a geometric transformation that quires determining intensity values of off-grid pixels using an interpolation kernel such as a weighted averaging filter. As illustrated in FIG. 3B, the size of the proposed Gaussian interpolation kernel may decrease as the distance from the center of the image increases.

Accordingly, the distortion correction unit 41 according to the example embodiment of the present inventive concepts may determine the size of the Gaussian interpolation kernel GIK according to α. In some embodiments, the distortion correction unit 41 increases the size of the Gaussian interpolation kernel GIK when the ratio of $r_D/r_U$ is greater than 1, and the distortion correction unit 41 reduces the size of the Gaussian interpolation kernel GIK when the ratio of $r_D/r_U$ is smaller than 1.

A pixel in the undistorted image UI may be generated by applying the Gaussian interpolation kernel GIK to corresponding pixels in the distorted image DI. Specifically, an integration value of a pixel in the undistorted image UI may be calculated by using a result, that is, a weight, generated by applying the Gaussian interpolation kernel GIK to a position of each of the corresponding pixels in the distorted image DI and an integration value of each of the corresponding pixels in the distorted image DI. The Gaussian interpolation kernel GIK may be a weight based on pixels located around the pixel in the undistorted image UI.

When a pixel in the undistorted image UI is located in a central region, α may increase, and, accordingly, the size of the Gaussian interpolation kernel GIK may increase. When a pixel in the undistorted image UI is located in a peripheral region, α may decrease, and, accordingly, the size of the Gaussian interpolation kernel GIK may decrease.

Equation 2 is a formula that calculates an integration value of a pixel $\hat{g}(x_U, y_U)$ in the undistorted image UI.

$$\hat{g}(x_U, y_U) = \sum_{m=-2}^{2}\sum_{n=-2}^{2} G\left(\alpha(r_U), \sqrt{m^2+n^2}\right) \cdot g(x_D+m, y_D+n) \quad \text{[Equation 2]}$$

Equation 3 denotes the Gaussian interpolation kernel GIK.

$$G\left(\alpha(r_U), \sqrt{m^2+n^2}\right) = \frac{1}{\sqrt{2\pi\sigma^2}} \exp\left\{-\frac{m^2+n^2}{2\sigma^2}\right\} \quad \text{[Equation 3]}$$

σ may vary according to $\alpha(r_U)$ in Equation 4.

$$\sigma = \frac{\alpha(r_U)}{K} \quad \text{[Equation 4]}$$

K is a constant that controls the trade-off between the amount of anti-aliasing and fuzziness of an edge of an image. In some embodiments, K may be 2.

The lens distortion correction device 40 according to the example embodiments of the present inventive concepts may control the size of the Gaussian interpolation kernel GIK according to α. For example, a pixel in a central region of the undistorted image UI may be generated by increasing the size of the Gaussian interpolation kernel GIK. A pixel in a peripheral region of the undistorted image UI may be, for example, generated by decreasing the size of the Gaussian interpolation kernel GIK.

Figure 4:
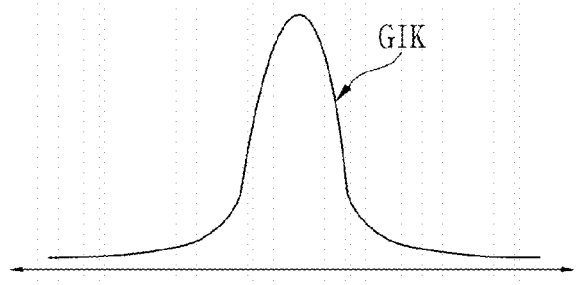
FIG. 4 illustrates a Gaussian interpolation kernel function.

FIG. 4 illustrates a Gaussian interpolation kernel function.

Referring to FIGS. 1 to 4, a Gaussian interpolation kernel function is illustrated.

The distortion correction unit 41 may be configured, or otherwise constructed and arranged, to calculate an integration value of an unmapped pixel in the undistorted image UI using the Gaussian interpolation kernel GIK.

Correction of the distorted image is performed by a geometric transformation that requires that intensity values of off-grid pixels be determined using an interpolation kernel such as a weighted averaging filter. As illustrated in FIG. 3B, α decreases as the distance $r_U$ from the center of the undistorted image UI increases, and, accordingly, the size of the Gaussian interpolation kernel decreases as the distance from the center of the undistorted image increases.

Figure 5:
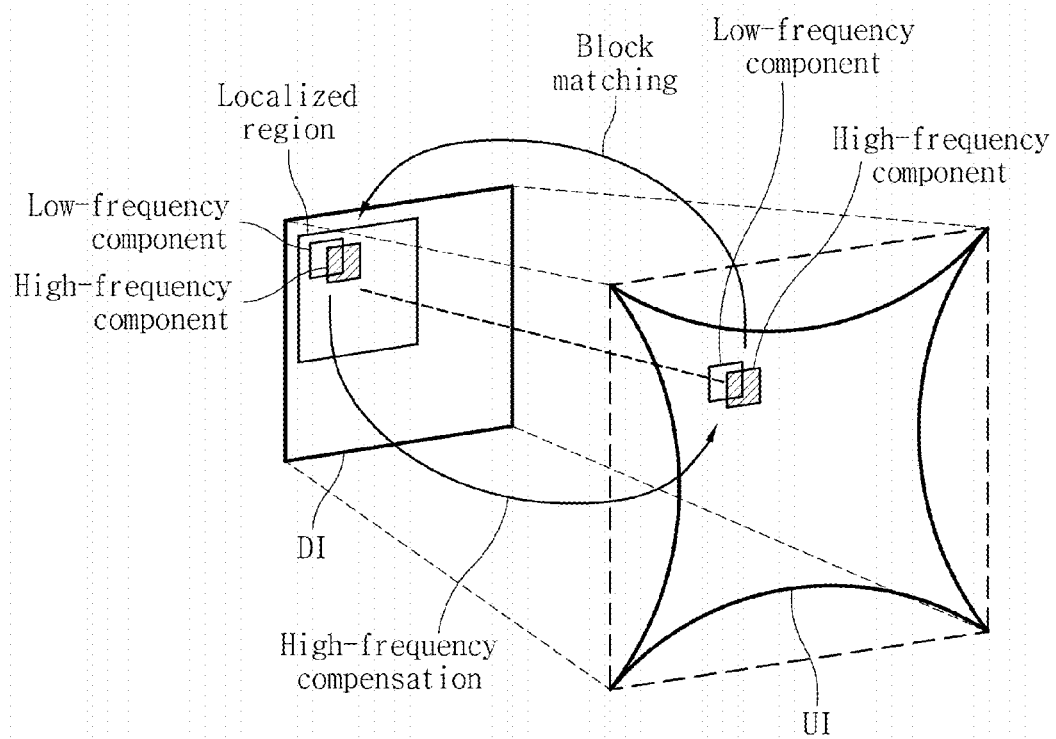
FIG. 5 is a conceptual diagram illustrating an operation for enhancing an undistorted image using the lens distortion correction device illustrated in FIG. 1 according to an example embodiment of the present inventive concepts.
Figure 6:
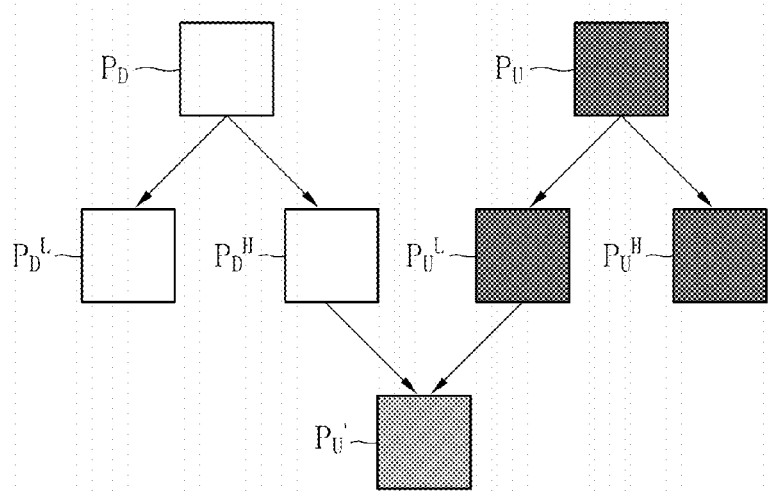
FIG. 6 illustrates a patch in a distorted image and a patch in an undistorted image illustrated in FIG. 5.

FIG. 5 is a conceptual diagram illustrating an operation for enhancing the undistorted image UI using the lens distortion correction device 40 illustrated in FIG. 1. FIG. 6 illustrates a patch in the distorted image DI and a patch in the undistorted image UI illustrated in FIG. 5.

Image resampling in the geometric transformation process results in blurring artifacts. More specifically, the image resampling in the geometric transformation process may not determine the optimal interpolation method resulting in both jagging and blurring artifacts in the corrected image. To prevent jagging and blurring artifacts in the corrected image a space-variant Gaussian interpolation may be used to minimize jagging artifacts, and, then, an additional image enhancement algorithm may be used to reduce blurring artifacts.

The LSS may be used for image super-resolution. The fundamental assumption of the LSS is that for every patch in the image, similar patches can be found in its downscaled or smoothed version in localized regions around the same relative coordinates. This assumption may improve the geometrically corrected image for sufficiently small patches.

Referring to FIGS. 1 to 5, the image enhancement unit 42 may improve the undistorted image UI based on the LSS. The distorted image DI and the undistorted image UI each include a plurality of patches. The plurality of patches in the distorted image DI and the plurality of patches in the undistorted image UI each include a low-frequency component and a high-frequency component.

A low-frequency component includes a major image or a background of an image. And a high-frequency component includes a boundary line of an image.

The image enhancement unit 42 may be configured, or otherwise constructed and arranged, to search for a patch having a closest integration value to an integration value of a patch in the undistorted image UI in a localized region in the distorted image DI and improve the undistorted image UI using a high-frequency component of the searched patch from the localized region in the distorted image DI.

The image enhancement unit 42 may be configured, or otherwise constructed and arranged, to remove the blurring artifact from the undistorted image UI by combining a low-frequency component of a patch in the undistorted image UI with the high-frequency component of the searched patch from the localized region in the distorted image DI.

The image enhancement unit 42 be configured, or otherwise constructed and arranged, to perform block matching based on LSS in order to search for a patch having a closest integration value to an integration value of a patch in the undistorted image UI in the localized region in the distortion image DI.

Equation 5 denotes a patch $g_{x_D+i, y_D+j}^{P}(k,l)$ in the distorted image DI, which has a closest integration value to an integration value of a patch $\hat{g}_{x_U, y_U}^{P}(k,l)$ in the undistorted image UI.

$$\hat{g}_{x_U, y_U}^{P}(k,l) = \hat{g}(x_U+k, y_U+l)$$

$$g_{x_D+i, y_D+j}^{P}(k,l) = g(x_D+k+i, y_D+l+j) \quad \text{[Equation 5]}$$

In this case, $\hat{g}_{x_U, y_U}^{P}(k,l)$ is a patch in the undistorted image UI, which is centered on $(x_U, y_U)$.

$g_{x_D+i, y_D+j}^{P}(k,l)$ is a patch in the distorted image DI, which is centered on $(x_D+i, y_D+j)$.

$B_H \times B_H$ is a patch size. i and j denote a displacement vector by units of patches.

Equation 6 denotes a formula that calculates an optimal displacement vector $(i_m, j_m)$. The optimal displacement vector may be calculated by minimizing a sum of absolute difference (SAD). That is, a displacement vector, which minimizes the difference between an integration value of a patch $\hat{g}_{x_U, y_U}^{P}(k,l)$ in the undistorted image UI and an integration value of a patch $g_{x_D+i, y_D+j}^{P}(k,l)$ in the distorted image DI, may be calculated by using Equation 6.

$$(i_m, j_m) = \operatorname*{argmin}_{(i,j)} \sum_k \sum_l \left| \hat{g}_{x_U, y_U}^{P}(k,l) - g_{x_D+i, y_D+j}^{P}(k,l) \right| \quad \text{[Equation 6]}$$

Referring to FIGS. 1, 5, and 6, the image enhancement unit 42 may be configured, or otherwise constructed and arranged, to decompose a patch $P_D$ in the distorted image DI and a patch $P_U$ in the undistorted image UI. Through the decomposition, a patch $P_D$ in the distorted image DI may be divided into a low-frequency component $P_D^L$ and a high-frequency component $P_D^H$. Through the decomposition, a patch $P_U$ in the undistorted image UI may be divided into a low-frequency component $P_U^L$ and a high-frequency component $P_U^H$.

The low-frequency component $P_U^L$ of the patch $P_U$ of the undistorted image UI may be generated by applying a Gaussian filter that has a $1/\alpha(r_U)$ variance. Likewise, the low-frequency component $P_D^L$ of the patch $P_D$ of the distorted image DI may be generated by applying a Gaussian filter that has a $1/\alpha(r_U)$ variance.

The high-frequency component $P_U^H$ of the patch $P_U$ of the undistorted image UI may be calculated by subtracting the low-frequency component $P_U^L$ of the patch $P_U$ in the undistorted image UI from the patch $P_U$ of the undistorted image UI. Likewise, the high-frequency component $P_D^H$ of the patch PD of the distorted image DI may be calculated by subtracting the low-frequency component $P_D^L$ of the patch $P_D$ in the distorted image DI from the patch $P_D$ of the distorted image DI.

Finally, $\hat{f}(x_U+k, y_U+l)$ is calculated with regard to all $(x_U, y_U)$ as follows.

Due to a distortion correction process, a blurring artifact may increase in the high-frequency component $P_U^H$ of the patch $P_U$ in the undistorted image UI. Accordingly, the image enhancement unit 42 may be configured, or otherwise constructed and arranged, to employ the high-frequency component $P_D^H$ of the patch $P_D$ in the distorted image DI instead of the high-frequency component $P_U^H$ of the patch $P_U$ in the undistorted image UI. That is, the image enhancement unit 42 may be configured, or otherwise constructed and arranged, to combine the low-frequency component $P_U^L$ of the patch $P_U$ in the undistorted image UI and the high-frequency component $P_D^H$ of the patch $P_D$ in the distorted image DI to generate a patch $P_U'$.

Equation 7 denotes a patch $\hat{f}(x_U+k, y_U+l)$ that is finally generated.

$$\hat{f}(x_U + k, y_U + l) = \hat{g}(x_U + k, y_U + l) + g_{x_D+i_m, y_D+j_m}^{HP} \cdot \frac{1}{B_H^2} \quad \text{[Equation 7]}$$

In this case, $g_{x_D+i_m, y_D+j_m}^{HP}$ is a high-frequency component of the selected or searched patch in the distorted image DI. $1/B_H^2$ is a constant that attenuates an overlapping region.

The undistorted image UI includes the blurring artifact. Accordingly, the lens distortion correction device 40 according to the example embodiment of the present inventive concepts may remove the blurring artifact from the undistorted image UI using the image enhancement method.

Figure 7A:
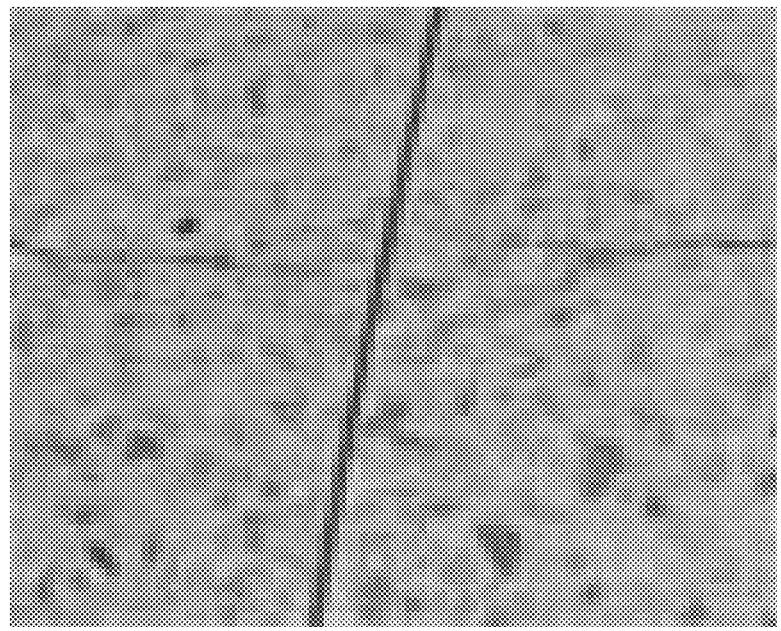
FIG. 7A illustrates a first distorted image.
Figure 7B:
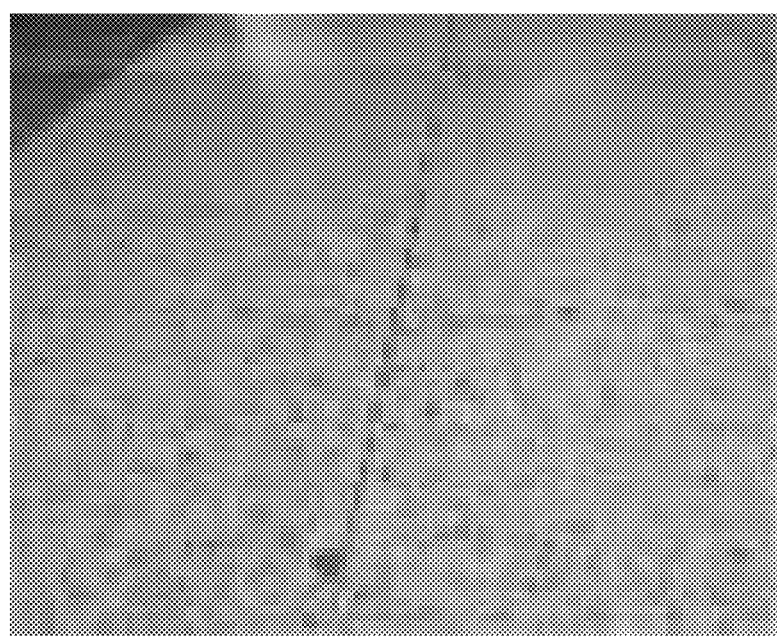
FIG. 7B illustrates a corrected image which is corrected using a bilinear interpolation on the image illustrated in FIG. 7A.
Figure 7C:
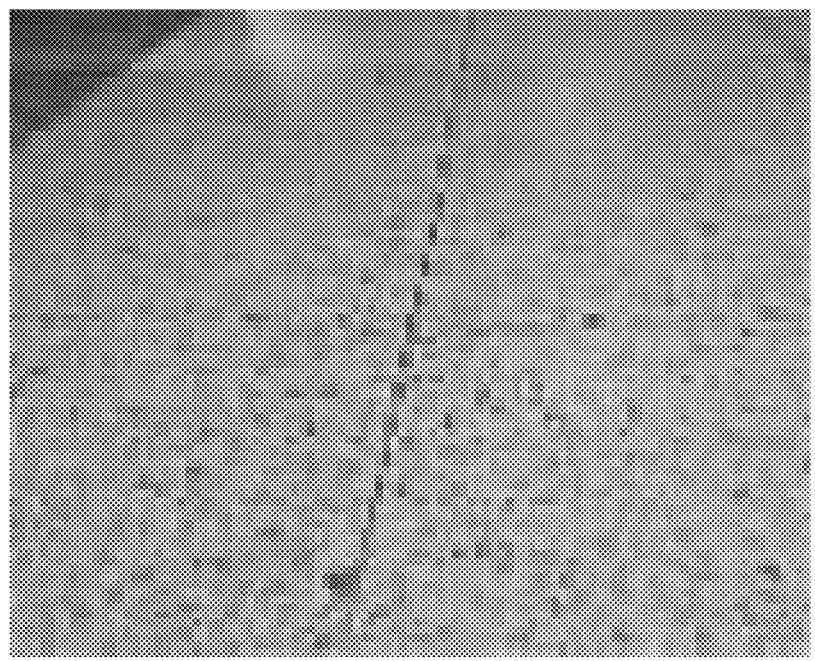
FIG. 7C illustrates a corrected image which is corrected using a high-order interpolation on the image shown in FIG. 7A.

FIGS. 7A to 7C illustrate result images according to a conventional art.

FIG. 7A illustrates a first distorted image. FIG. 7B illustrates a corrected image that is generated by applying a bilinear interpolation to the first distorted image illustrated in FIG. 7A. The bilinear interpolation is a conventional method of correcting an image. FIG. 7C illustrates a corrected image that is generated by applying a high-order interpolation to the distorted image in FIG. 7A. The high-order interpolation is a conventional method of correcting an image.

In a process correcting a geometric distortion of a wide-angle lens image using a conventional method, for example, the bilinear interpolation as illustrated in FIG. 7B or the high-order interpolation as illustrated in FIG. 7C, an aliasing artifact that is a phenomenon in which a boundary line appears discontinuously, a blurring artifact that is a phenomenon in which an object is blurred, and a jagging artifact that is a staircase phenomenon may occur.

When comparing the first distorted image illustrated in FIG. 7A with the images illustrated in FIGS. 7B and 7C, aliasing artifacts occur in the images illustrated in FIGS. 7B and 7C.

Figure 8:
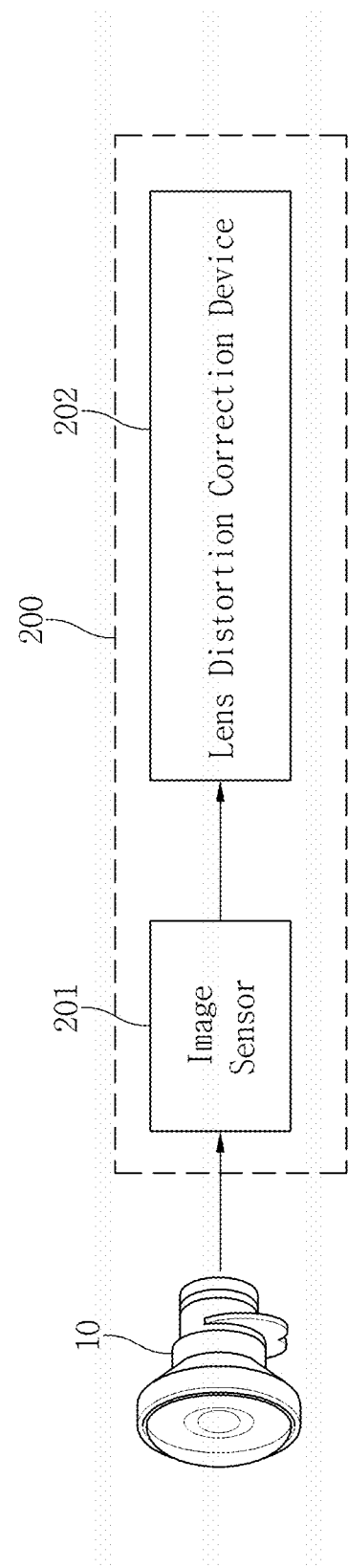
FIG. 8 is a block diagram illustrating an image sensor module including a wide-angle lens distortion correction device according to an example embodiment of the present inventive concepts.

FIG. 8 is a block diagram illustrating an image sensor module 200 including a wide-angle lens distortion correction device 202 according to an example embodiment of the present inventive concepts.

Referring to FIG. 8, the image sensor module 200 may include an image sensor 201 and the lens distortion correction device 202. In some embodiments, the image sensor module 200 may be installed in a digital camera device, a smart-phone, a tablet, or the like.

The image sensor 201 may acquire image data of an object through a wide-angle lens 10. The image sensor 201 transfers the image data from the wide-angle lens 10 to the wide-angle lens correction device 202. In some embodiments, the image sensor 201 may include a CMOS image sensor or a CCD image sensor.

The lens distortion correction device 202 corrects a distortion using scalable Gaussian interpolation kernels and enhances a boundary line using self-examples based on the LSS. In some embodiments, the lens distortion correction device 202 may include the lens distortion correction device 40 illustrated and described in connection with FIG. 1.

Figure 9:
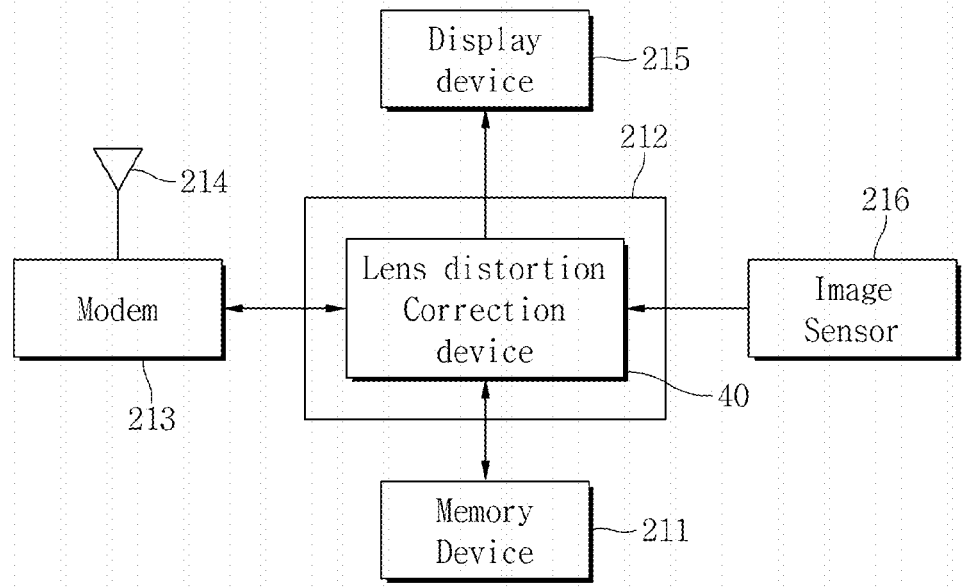
FIG. 9 is a block diagram of a mobile device including the lens distortion correction device illustrated in FIG. 1 according to an example embodiment of the present inventive concepts.

FIG. 9 is a block diagram of a mobile device 210 including the lens distortion correction device 40 illustrated in FIG. 1 according to an example embodiment of the present inventive concepts.

Referring to FIG. 9, the mobile device 210 may be a smart-phone, a table personal computer (PC), a ultra-mobile personal computer (UMPC), a personal digital assistant (PDA), a portable multimedia player (PMP), an MP3 player, an MP4 player, or the like.

The mobile device 210 may include a memory device 211, an application processor 212 including a memory controller for controlling the memory device 211, a modem 213, an antenna 214, a display device 215 and an image sensor 216.

The modem 213 may receive and transmit a radio signal through the antenna 214. For example, the modem 213 may convert the radio signal through the antenna 214 into a signal which may be provided to and processed by the application processor 212. In some embodiments, the modem 213 may be a long term evolution (LTE) transceiver, a high speed downlink packet access/wideband code division multiple access (HSDPA/WCDMA) transceiver, a global system for mobile communications (GSM) transceiver, or the like.

The application processor 212 may receive and process a signal output from the modem 213, and may transmit the processed signal to the display device 215. Further, the modem 213 may convert a signal transmitted from the application processor 212 into a radio signal, and output the converted radio signal to an external device through the antenna 214.

The image sensor 216 may acquire image data of an object through a wide-angle lens. The image sensor 216 transfers the image data from the wide-angle lens to the lens distortion correction device 40 of the application processor 212. In some embodiments, the image sensor 216 may include a CMOS image sensor or a CCD image sensor.

The application processor 212 includes a lens distortion correction device 40. The lens distortion correction device 40 may correct a distorted image generated by a wide-angle lens and enhance the corrected image. In some embodiments, the lens distortion correction device 40 may include the lens distortion correction device 40 illustrated and described in connection with FIG. 1.

Figure 10:
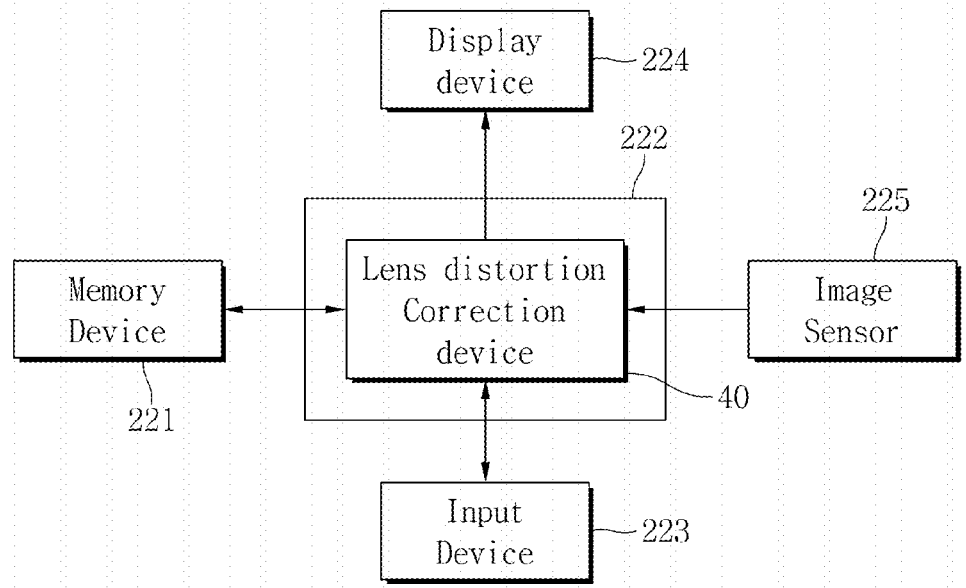
FIG. 10 is a block diagram of a mobile device including the lens distortion correction device illustrated in FIG. 1 according to an example embodiment of the present inventive concepts.

FIG. 10 is a block diagram of a mobile device 220 including the lens distortion correction device 40 illustrated in FIG. 1 according to an example embodiment of the present inventive concepts.

Referring to FIG. 10, the mobile device 220 may be an image processing device, for example, a digital camera, or a mobile phone, a smart phone, a tablet PC, or the like to which a digital camera is attached.

The mobile device 220 includes a memory device 221, an application processor 222 including a memory controller for controlling a data processing operation of the memory device 221, an input device 223, a display device 224 and an image sensor 225.

The input device 223 is a device for inputting a control signal for controlling an operation of the application processor 222 or data being processed by the application processor 222, and may be implemented as a pointing device such as a touch pad and computer mouse, a keypad, a keyboard, or the like.

The application processor 222 displays data stored in the memory device 221 through the display device 224. The application processor 222 may control overall operations of the mobile device 220.

The image sensor 225 may acquire image data of an object through a wide-angle lens. The image sensor 225 transfers the image data from the wide-angle lens to the lens distortion correction device 40 of the application processor 222. In some embodiments, the image sensor 225 may include a CMOS image sensor or a CCD image sensor.

The application processor 222 includes a lens distortion correction device 40. The lens distortion correction device 40 may correct a distorted image generated by a wide-angle lens and improve the corrected image. In some embodiments, the lens distortion correction device 40 may include the lens distortion correction device 40 illustrated and described in connection with FIG. 1.

Figure 11:
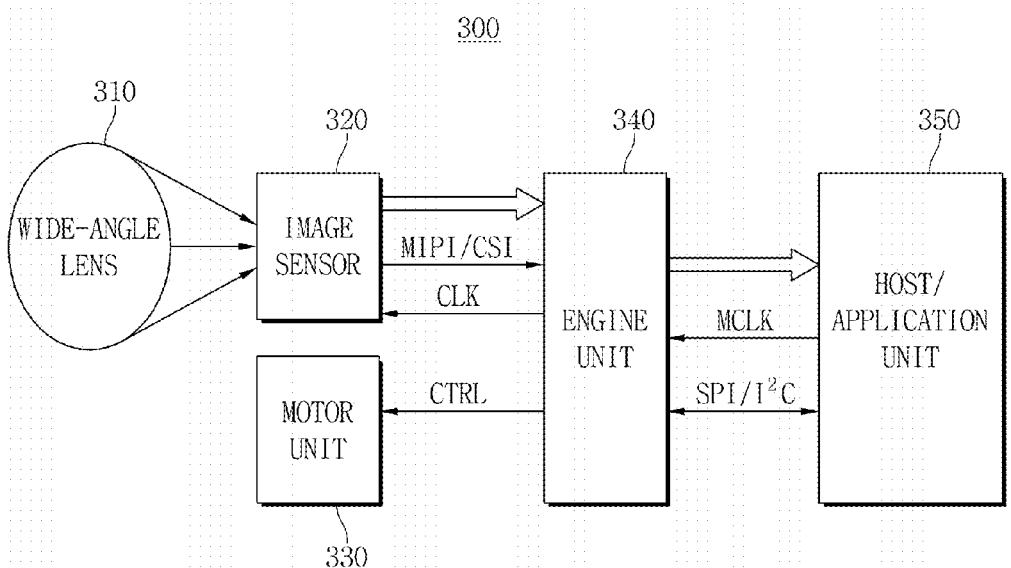
FIG. 11 is a block diagram illustrating a camera system according to an example embodiment of the present inventive concepts.

FIG. 11 is a block diagram illustrating a camera system 300 according to an example embodiment of the present inventive concepts. In some embodiments, the camera system 300 may include a digital camera device.

Referring to FIGS. 1 and 11, the camera system 300 may include a wide-angle lens 310, an image sensor 320, a motor unit 330, an engine unit 340, and a host/application unit 350. The image sensor 320 may include the image sensor 20 illustrated in FIG. 1. The image sensor 320 may include the image processor 30 illustrated in FIG. 1.

The wide-angle lens 310 integrates an incident light to an integration region, that is, a photodiode, of the image sensor 320.

The image sensor 320 generates image data based on the incident light through the lens 310. The image sensor 320 may provide the image data based on a clock signal CLK. In some embodiments, the image sensor 320 may interface with the engine unit 340 through a mobile industry processor interface (MIPI) and/or a camera serial interface (CSI).

The motor unit 330 may control a focus of the lens 310 in response to a received control signal CTRL from the engine unit 340, or perform shuttering.

The engine unit 340 controls the image sensor 320 and the motor unit 330. Further, the engine unit 340 may generate YUV data including a distance from a subject, a luminance component, a difference between the luminance component and a blue component, and a difference between the luminance component and a red component based on a distance received from the image sensor 320 and image data, or generate compression data, for example, joint photography experts group (JPEG) data.

The engine unit 340 may be connected to the host/application unit 350. And the engine unit 340 provides YUV data or JPEG data to the host/application unit 350 based on a master clock MCLK. Further, the engine unit 340 may interface with the host/application unit 350 through a serial peripheral interface (SPI) and/or an inter-integrated circuit ($I^2C$).

In some embodiments, the engine unit 340 may correct a distorted image from the image sensor 320 and enhance the corrected image, and the engine unit 340 may include the lens distortion correction device 40 illustrated and described in connection with FIG. 1.

Figure 12:
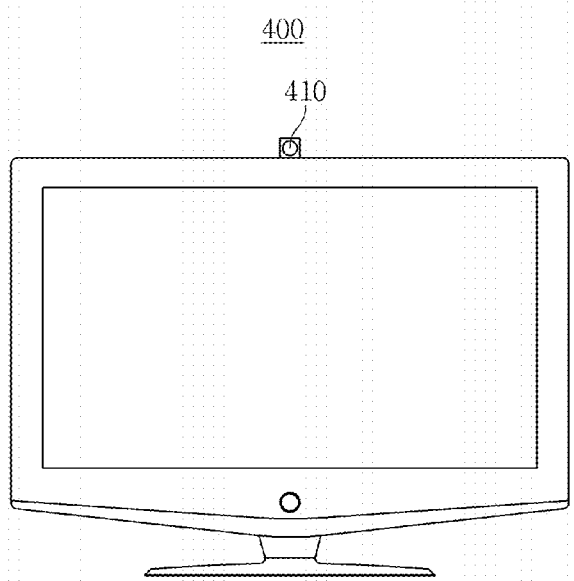
FIG. 12 is a display device including the lens distortion correction device illustrated in FIG. 8 according to an example embodiment of the present inventive concepts.

FIG. 12 is a display device 400 including the lens distortion correction device 202 illustrated in FIG. 8 according to an example embodiment of the present inventive concepts.

Referring to FIG. 12, the display device 400 may be, for example, a display device installed in a smart TV, a monitor, various mobile devices, or the like.

The display device 400 may include a camera device 410. When the display device 400 is the smart TV, various applications may be installed in the display device 400.

For example, a user may perform a video call application using the camera device 410 installed in the display device 400. In some embodiments, the camera device 410 may include the image sensor module 200 illustrated in FIG. 8.

A lens distortion correction device according to the example embodiments of the present inventive concepts may correct a distortion of an image photographed by a wide-angle lens and improve the corrected image.

Further, the lens distortion correction device according to the example embodiments of the present inventive concepts may remove a blurring artifact in the corrected image.

The present inventive concepts may be applied to a lens distortion correction device, and an application processor and a mobile device including the same.

The foregoing is illustrative of example embodiments and is not to be construed as limiting thereof. Although a few embodiments have been described, those skilled in the art will readily appreciate that many modifications are possible without materially departing from the novel teachings and advantages. Accordingly, all such modifications are intended to be included within the scope of the present inventive concepts as defined in the claims.

What is claimed is:

1. An application processor, comprising:
   an image signal processing circuit to receive a image signal from an image sensor; and
   a memory controller to control a data processing operation of a memory device,
   wherein the image signal processing circuit comprises:
   a distortion correction circuit to correct a distorted image into an undistorted image; and
   an image enhancement circuit to improve the undistorted image using a high-frequency component of the distorted image,
   wherein the distortion correction circuit corrects the distorted image using a size of a Gaussian interpolation kernel controlled according to a degree of distortion determined based on a distance from a center of a image, and wherein a plurality of patches in the distorted image and a plurality of patches in the undistorted image each include a low-frequency component and a high-frequency component.

2. The application processor according to claim 1, wherein the lens distortion correction device is applied to a super-resolution device.

3. The application processor according to claim 1, wherein the distortion correction circuit determines the degree of distortion according to a distortion ratio of a distance from a center of the distorted image to a distance from a center of the undistorted image.

4. The application processor according to claim 3, wherein the distortion correction circuit corrects the distorted image into the undistorted image using the Gaussian interpolation kernel and controls the size of the Gaussian interpolation kernel according to the degree of distortion.

5. The application processor according to claim 4, wherein the distortion correction circuit increases the size of the Gaussian interpolation kernel when the distortion ratio is greater than 1 and reduces the size of the Gaussian interpolation kernel when the distortion ratio is smaller than 1.

6. The application processor according to claim 1, wherein the image enhancement circuit is configured to search for a patch having a closest integration value to an integration value of a patch in the undistorted image in a localized region in the distorted image, and improve the undistorted image using a high-frequency component of the searched patch of the distorted image.

7. The application processor according to claim 6, wherein the image enhancement circuit combines the low-frequency component of a patch in the undistorted image with the high-frequency component of the searched patch of the distorted image and removes a blurring artifact from the undistorted image.

8. A CMOS image sensor, comprising:
an image signal processing circuit to receive a image signal from an image sensor,
wherein the image signal processing circuit comprises:
a distortion correction circuit configured to correct a distorted image into an undistorted image; and
an image enhancement circuit configured to improve the undistorted image using a high-frequency component of the distorted image,
wherein the distortion correction circuit corrects the distorted image using a size of a Gaussian interpolation kernel controlled according to a degree of distortion determined based on a distance from a center of a image, and
wherein a plurality of patches in the distorted image and a plurality of patches in the undistorted image each include a low-frequency component and a high-frequency component.

9. The CMOS image sensor according to claim 8, wherein the distortion correction circuit determines the degree of distortion according to a distortion ratio of a distance from a center of the distorted image to a distance to a center of the undistorted image.

10. The CMOS image sensor according to claim 9, wherein the distortion correction circuit corrects the distorted image into the undistorted image using the Gaussian interpolation kernel, controls the size of the Gaussian interpolation kernel according to the degree of distortion, increases the size of the Gaussian interpolation kernel when the distortion ratio is greater than 1, and reduces the size of the Gaussian interpolation kernel when the distortion ratio is smaller than 1.

11. The CMOS image sensor according to claim 8, wherein the image enhancement circuit is configured to search for a patch having a closest integration value to an integration value of a patch in the undistorted image in a localized region in the distorted image, and improve the undistorted image using a high-frequency component of the searched patch of the distorted image.

12. The CMOS image sensor according to claim 11, wherein the image enhancement circuit combines the low-frequency component of a patch in the undistorted image with the high-frequency component of the searched patch of the distorted image and removes a blurring artifact from the undistorted image.

13. A mobile device, comprising:
a wide-angle lens;
a CMOS image sensor to process an image through the wide-angle lens; and
a display to display the processed image,
wherein the CMOS image sensor comprises;
an image sensor to generate an image signal; and
an image signal processing circuit to receive the image signal from the image sensor and perform image processing on the received image signal,
wherein the image signal processing circuit comprises:
a distortion correction circuit configured to correct a distorted image into an undistorted image; and
an image enhancement circuit configured to improve the undistorted image using a high-frequency component of the distorted image,
wherein the distortion correction circuit corrects the distorted image using a size of a Gaussian interpolation kernel controlled according to a degree of distortion determined based on a distance from a center of a image, and
wherein a plurality of patches in the distorted image and a plurality of patches in the undistorted image each include a low-frequency component and a high-frequency component.

14. The mobile device according to claim 13, wherein the distortion correction circuit determines the degree of distortion according to a distortion ratio of a distance from a center of the distorted image to a distance from a center of the undistorted image.

15. The mobile device according to claim 14, wherein the distortion correction circuit corrects the distorted image into the undistorted image using the Gaussian interpolation kernel, controls the size of the Gaussian interpolation kernel according to the degree of distortion, increases the size of the Gaussian interpolation kernel when the distortion ratio is greater than 1, and reduces the size of the Gaussian interpolation kernel when the distortion ratio is smaller than 1.

16. The mobile device according to claim 13, wherein the image enhancement circuit is configured to search for a patch having a closest integration value to an integration value of a patch in the undistorted image in a localized region in the distorted image, and enhance the undistorted image using a high-frequency component of the searched patch of the distorted image.

17. The mobile device according to claim 16, wherein the image enhancement circuit combines the low-frequency component of a patch in the undistorted image with the high-frequency component of the searched patch of the distorted image and removes a blurring artifact from the undistorted image.

* * * * *